United States Patent [19]

Cunningham

[11] Patent Number: 5,014,402
[45] Date of Patent: May 14, 1991

[54] TENTER APPARATUS

[75] Inventor: Wallace Cunningham, Newton Mearnes, United Kingdom

[73] Assignees: G. Bruckner GmbH; Bruckner-Maschinenbau Co. KG, both of Fed. Rep. of Germany

[21] Appl. No.: 334,979
[22] PCT Filed: Jun. 24, 1988
[86] PCT No.: PCT/GB88/00506
§ 371 Date: Feb. 23, 1989
§ 102(e) Date: Feb. 23, 1989
[87] PCT Pub. No.: WO88/10189
PCT Pub. Date: Dec. 29, 1988

[30] Foreign Application Priority Data
Jun. 25, 1987 [GB] United Kingdom ............... 8714935

[51] Int. Cl.$^5$ ............................ D06C 3/02; D06C 3/00
[52] U.S. Cl. ................................. 26/91; 26/92; 26/93; 26/76
[58] Field of Search ............... 26/76, 89, 91, 92, 93

[56] References Cited

U.S. PATENT DOCUMENTS

| 2,412,187 | 12/1946 | Wiley et al. | 26/92 |
| 2,729,874 | 1/1956 | McCreary | 26/91 |
| 2,866,231 | 12/1958 | Vaughn | 26/92 |
| 2,923,966 | 2/1960 | Tooke | 26/92 |
| 3,014,234 | 12/1961 | Koppehele | 26/93 |
| 3,066,377 | 12/1962 | Waterman | 26/91 |
| 3,078,504 | 2/1963 | Koppehele | 26/91 |
| 3,172,151 | 3/1965 | Glossman | 18/1 |
| 3,179,976 | 4/1965 | Nash | 26/91 |
| 3,418,702 | 12/1968 | Coburn | 26/93 |
| 3,529,332 | 9/1970 | Hyatt | 26/91 |
| 3,611,479 | 9/1969 | Wicksall | 26/92 |
| 3,765,067 | 10/1973 | Fisher | 26/93 |
| 4,639,984 | 2/1987 | Langer | 26/94 |

FOREIGN PATENT DOCUMENTS

| 1504507 | 3/1969 | Fed. Rep. of Germany | 26/93 |
| 3703097 | 3/1988 | Fed. Rep. of Germany . | |
| 1381346 | 9/1963 | France . | |
| 941358 | 11/1963 | United Kingdom | 26/92 |
| 1015499 | 11/1963 | United Kingdom . | |
| 1223482 | 12/1967 | United Kingdom . | |

Primary Examiner—Werner H. Schroeder
Assistant Examiner—Bibhu Mohanty
Attorney, Agent, or Firm—Howson and Howson

[57] ABSTRACT

Stenter apparatus for stretching a web to produce a relatively thin film comprises two transversely spaced endless chains one the mirror image of the other relative to the stenter center line (C—C), each chain comprising an inner feed run (9) and an outer return run (10) mounted on supports. Each endless chain is constituted by film clip holders (3) and the chain pases around end sprockets (11B, 12B). The present invention provides a means for lateral adjustment of the feed runs (9) comprising adjustment means for lateral movement of the feed run support relative to the return run support and pivoting portions (10A, 10B) in the outer run support adjacent the end sprockets (11B, 12B) to enable said lateral movement of the feed run. Consequently a major portion of the outer run support does not require to have lateral movement and can be fixed in position and this provides economies in the construction. Further, end sprockets (11B, 12B) of smaller diameter can be used.

10 Claims, 9 Drawing Sheets

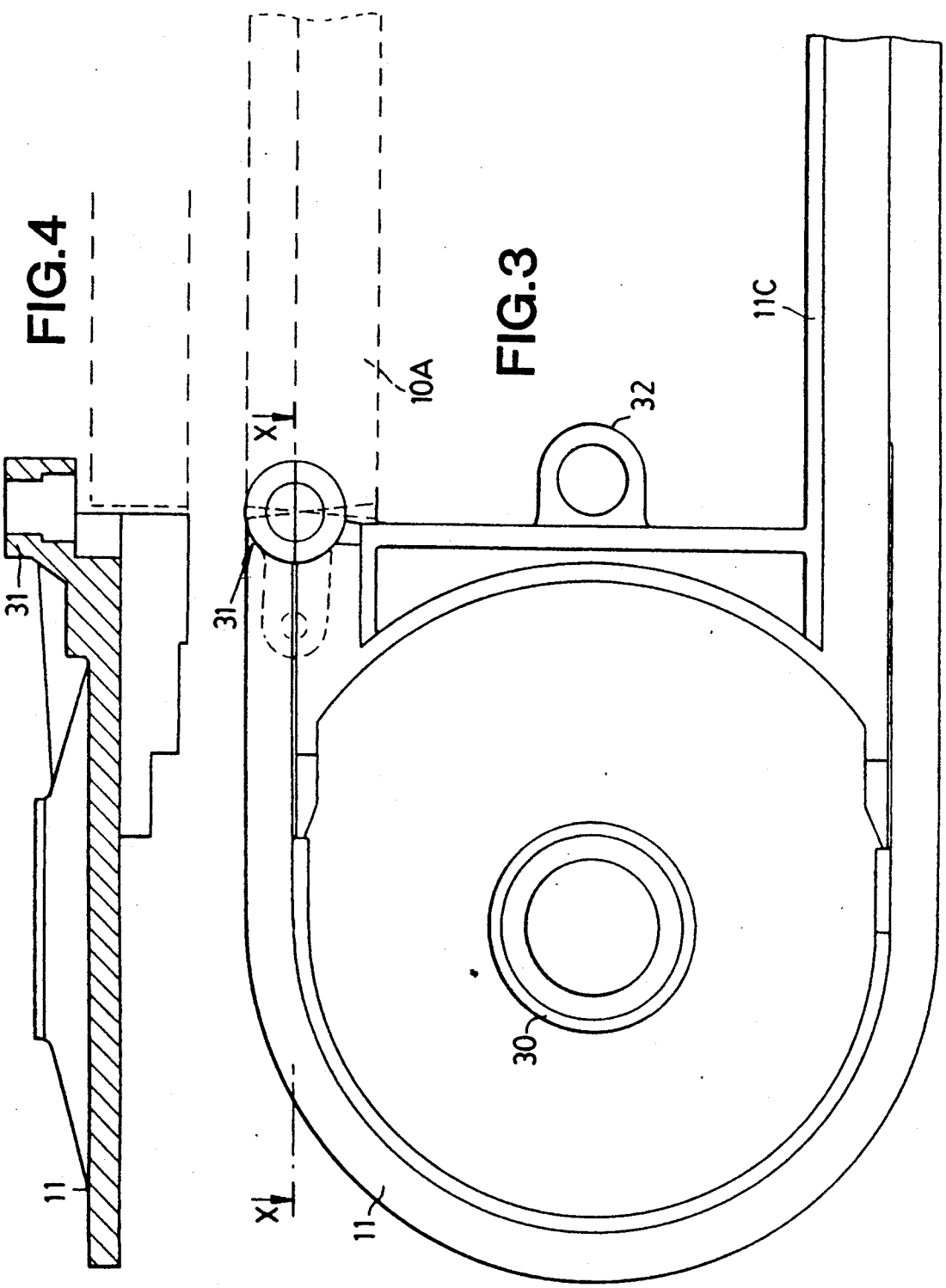

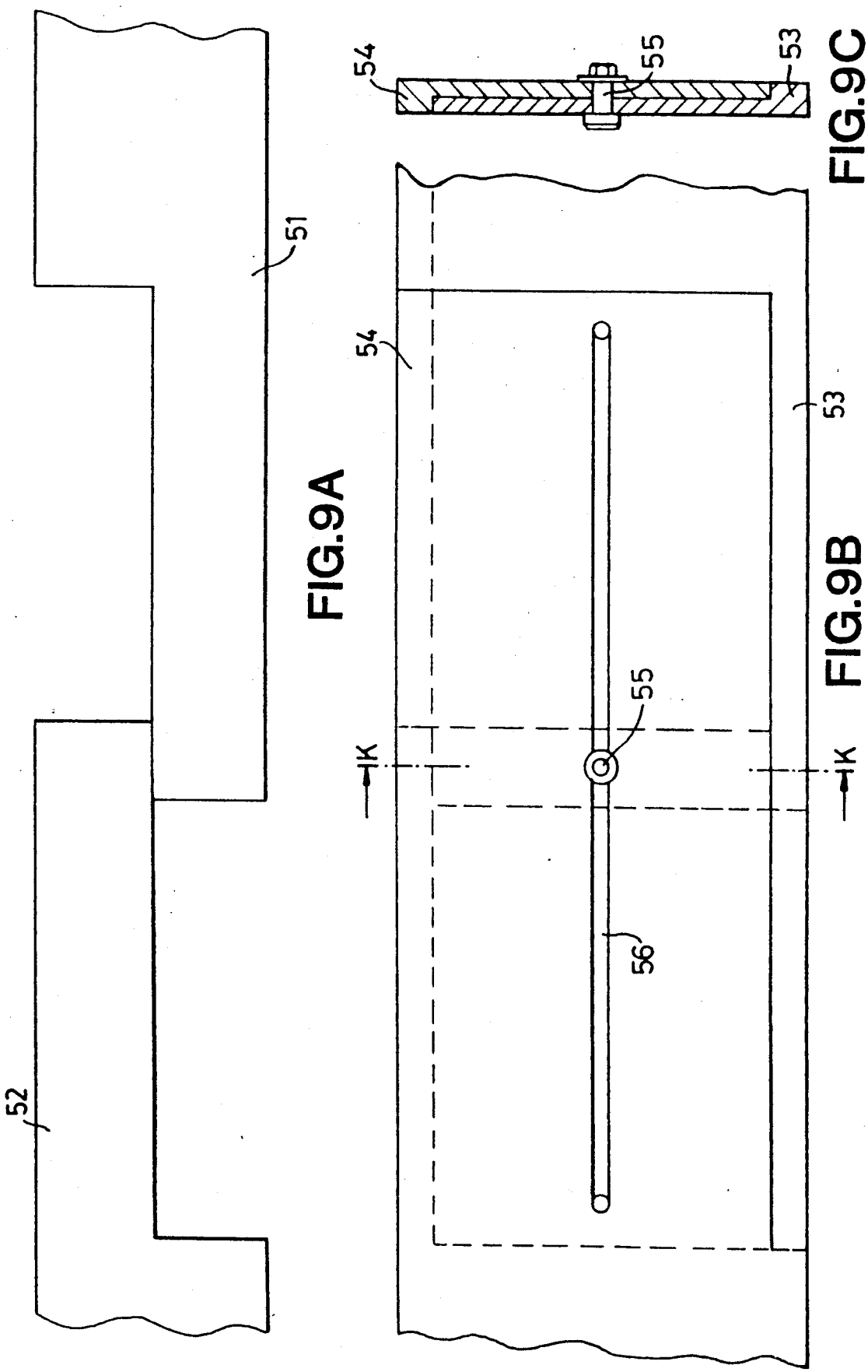

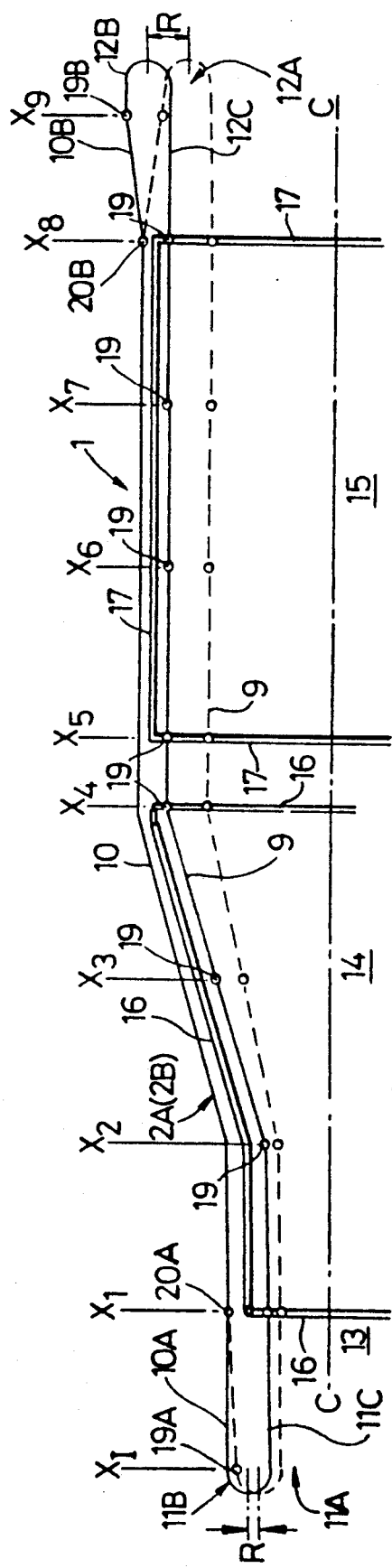
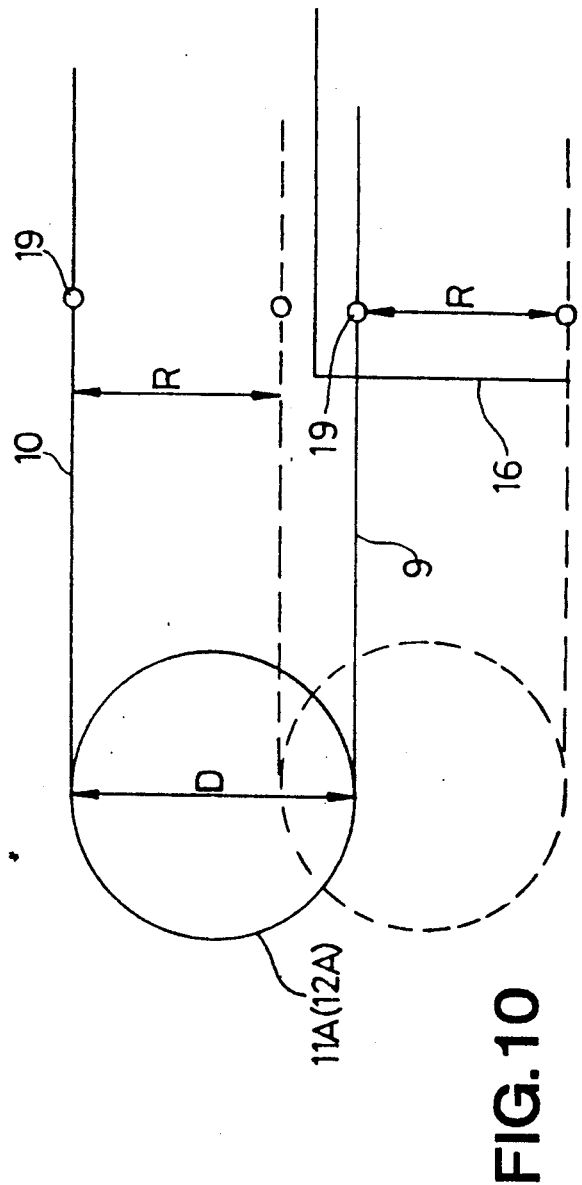
FIG. 12
FIG. 10

TENTER APPARATUS

BACKGROUND OF THE INVENTION

The present invention relates to tenter apparatus hereinafter stenter apparatus for stretching a web to produce a relatively thin film, and especially to stenter apparatus comprising laterally spaced pairs of endless chains or bands each of which includes film clip holders running on rails, facing inner or feed runs of the chains or bands defining a film conveying passage comprising in succession an inlet section, a diverging film stretching section and an outlet or relaxation section, end sprockets being present at the ends of the inner feed run and the outer or return run of the chains. Such apparatus is hereinafter referred to as stenter apparatus of the type aforesaid.

Stenter apparatus of the type aforesaid in shown in UK Patent Specification No. 1015499 wherein the film holder rails are mounted on a supporting frame structure. For heating and/or cooling of the film, the stenter of No. 1015499 includes chamber means through which passes film gripped on the feed runs of the chains, the chamber means consequently housing the portions of the feed runs of the chains defining at least parts of the film feed, stretching and outlet sections. For operational and economy reasons the return runs of the chains are located outside the chamber means. Additionally No. 1015499 includes adjustment means for lateral movement of the feed and return runs of each chain in parallelogram manner so that the spacing between the opposed feed runs can be varied so as to enable for example the degree of stretch imparted by the apparatus to be varied. More specifically the rails comprise a series of pivotally jointed sections with a carrying block at each joint, and the adjustment means includes transverse control shafts threaded to said carrying blocks and rotatable to move the blocks for parallelogram motion f the feed and return rail sections of each endless chain, the adjustment means being such that opposed lateral movements of the two chains are effected simultaneously relative to the centre-line of the stenter. Equivalent lateral movements are imparted to the end sprockets. The necessary apertures at the ends of the chamber means for the feed runs are of sealed slot form to accommodate the lateral movements of the feed runs. The stenter apparatus of No. 1015499 has the following disadvantages, namely:

1. The stenter apparatus is complex, in particular requiring a considerable number of pivotal joints for the rail sections to permit desired width variations and patterns to be obtained along the length of the film conveying passage; and
2. The end sprockets have to be of relatively large diameter to allow a reasonable degree of lateral movement of the inner feed run if the outer return run which moves laterally with the feed run is not to foul the chamber means.

SUMMARY OF THE INVENTION

It is an object of the present invention to provide an improved stenter apparatus of the type aforesaid which obviates or mitigates these disadvantages.

According to the present invention, stenter apparatus of the type aforesaid includes shifting means to permit adjustment movements of the feed run towards or away from the corresponding return run, and pivot means to permit pivoting motion of portions of the return run adjacent the ends of the run to allow said adjustment movements.

Thus by the present invention the bulk of the return run of each chain or band can occupy a set position while the feed runs are movable laterally as desired relative to the set return runs for variation of the width pattern of the film conveying passage. Again the end sprockets move laterally in unison with the associated feed run. The set outer run can therefore utilise a continuous rail or fixed rail section and there is a consequent reduction in the number of pivot joints required, all of which leads to economies in the construction. Further, since the outer run does not now move laterally with the feed run end sprockets of considerably reduced diameter can be utilised.

Preferably the pivot means comprises an adjustable length radius arm.

In a preferred embodiment, the radius arm is hingeably connected at one end to a carrying body of an end sprocket and at the other end to an end of a set section of the return run.

Chain tensioning and adjustment means will desirably be present to cater for the relative changing geometry of the feed and return runs, and these means can be located at an end sprocket.

Preferably the shifting means comprises transversely located rotatable shafts which are threaded to support elements of the inner run; these support elements will be located at pivot points of adjacent sections of the inner run.

In one preferred embodiment both the inner feed run and the outer return run of each endless chain passes through film treatment apparatus e.g. a heater or cooler.

In an alternative embodiment the outer return of the endless chain passes on the outside of film treatment apparatus.

BRIEF DESCRIPTION OF THE INVENTION

Embodiments of the present invention will now be described by way of example with reference to the accompanying drawings wherein, FIG. 1 shows a schematic plan view of the left hand rail/chain of stenter apparatus to one side of the stentor line, in accordance with one embodiment of the present invention;

FIG. 3 shows a plan view of a sprocket support of the entry rail portion;

FIG. 4 shows the section 4—4 of FIG. 3;

FIG. 9A shows a plan view of a horizontal track including an extension joint of the apparatus of FIG. 1;

FIG. 9B shows a side view of a vertical track including an extension joint;

FIG. 9C shows an end view of the track of FIG. 12B through section K—K in FIG. 9B.

FIG. 10 shows a plan view of a prior art stenter rail/-chain including a chain sprocket; and FIGS. 11 and 12 show views similar to FIG. 1 of second and third embodiments of the invention.

DESCRIPTION OF THE PREFERRED EMBODIMENTS

Figure 1:
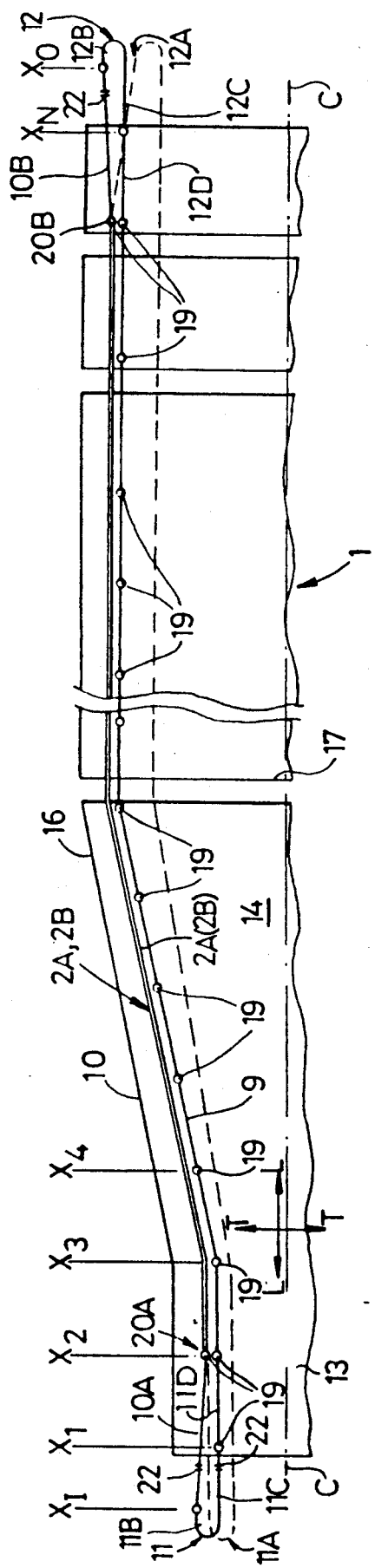

Referring to FIG. 1, stenter apparatus for stretching a web of material so as to produce a thin film comprises a pair of laterally spaced rail systems, one the mirror image of the other, and one of these rail systems 1 (i.e. the stenter's left hand rail) is schematically illustrated in FIG. 1. The rail systems 1 are laterally spaced from the stenter's centre line C—C, and the rail 2A, 2B of the system 1 supports a conveying system including and endless chain with a feed run 9 (i.e. the film rail) and a return run 10, between end sprockets 11B, 12B carried by sprocket carrier members 11, 12. One of the sprockets 12B can serve as a drive sprocket for the chain formed by the holders 3.

The opposed feed runs 9 of the facing rail systems 1 define a film feed conveying passage comprising in succession an inlet section 13 at the inlet end 11A, a diverging film stretching section 14 and finally an outlet (or relaxation) section 15 extending to the outlet end 12A. Suitable apparatus such as that described in UK Patent Specification No. 1598020, can be provided to feed the film web to the inlet section 13.

The web passes through a heating chamber (or oven) 16 extending between the inlet and stretching sections 13, 14 as shown, while crystalling or cooling chambers 17 extend at the outlet section 15. In the FIG. 1 embodiment both the feed and return runs 9, 10 pass through these chambers 16, 17.

It is a requirement that the width pattern of the film conveying passage is variable, for example for variation of the degree of stretch imparted to the film by the stenter or to handle film webs of different width, and for this requirement the present stenter has means for lateral movement of the rail of the feed run 9. In particular, means are provided at various positions of inlet and outlet crossheads $X_I$, $X_O$ and intermediate crossheads, $X_1$, $X_2$, $X_3$, ... $X_N$ (depending on number) for transverse motion of the rail at the crossheads as described later. However in accordance with the present invention the bulk of the outer run 10, specifically from point 20A to point 20B, is set in position and is not laterally movable. The rail portion from 20A to 20B can therefore have fixed and continuous tracks without flexible joints, and this provides advantages as regards cost, operation and maintenance. To permit lateral movement of the run 9 relative to the set run 10, end portion 10A, 10B of the run 10 adjacent the end sprockets 11B, 12B are arranged to be pivotal. In this example the portion 10A is pivotal at the second intermediate crosshead $X_2$, while the portion 10B is pivotal at the penultimate of the intermediate crossheads. Since the feed entry will always be parallel the inlet sprocket carrier member 11 includes a short fixed arm 11C extending longitudinally to the first flexible joint 19 of the run 9 at the first intermediate crosshead $X_1$, while the portion 10A is in the form of a swinging radius arm having one end pivotally connected at point 20A and the other flexibly connected to the sprocket carrier 11 at point 19A. A further arm 11D extends from arm 11C to a pivoting point 19 in run 9 at the second intermediate crosshead $X_2$. The arm 10A includes extension means for length adjustability. The arrangement at the outlet end is similar, the swinging arm portion 10B being pivoted at points 20B and 19B on the carrier 12B including longitudinal arms 12C with pivot for the 12C in run 9.

FIG. 1 shows the feed run 9 at maximum width position (full line) and at minimum width position (dashed line), the pivoting of the arm portions 10A, 10B to permit movement of these positions being evident in FIG. 1. The carriers 11, 12 have linear lateral movement (achieved by shifting means as previous) but this is achievable by virtue of the length adjustability of portions 10A, 10B and resultant chain length variation is catered for by a suitable chain tensioning and adjustment device provided at the inlet sprocket 11A. The run 9 will enter and leave the chambers 16, 17 via sealed slots permitting the lateral movement of the run 9. By way of example, the maximum conveying passage width (full line) achievable at outlet may be about four times greater than the minimum width (dashed line) at the inlet.

Figure 2:
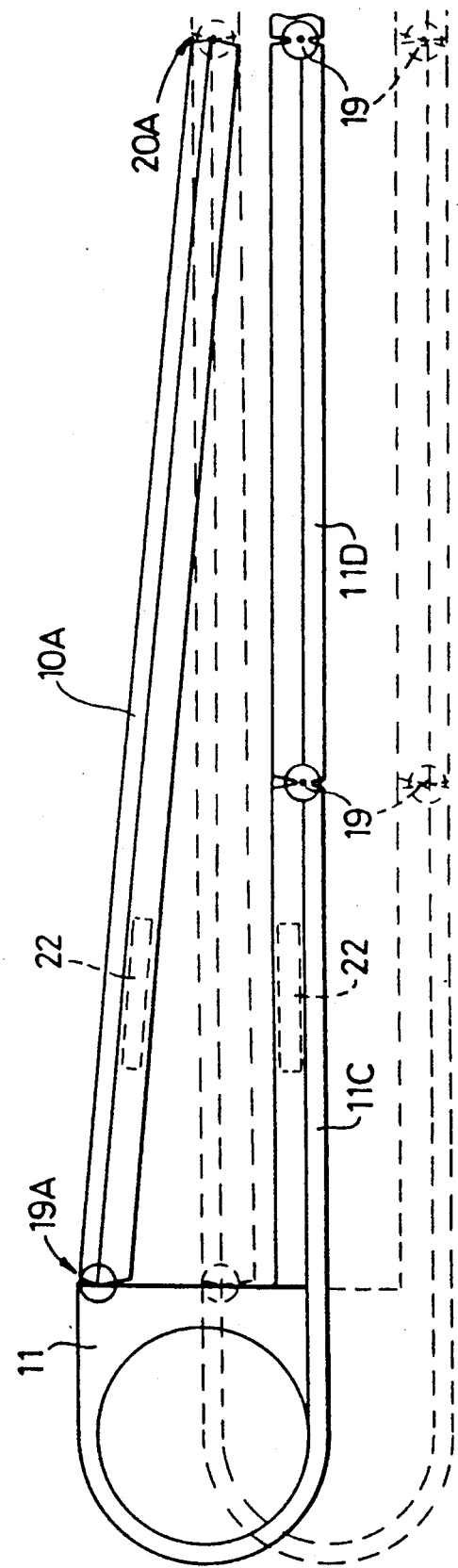
FIG. 2 shows in greater detail a plan view of an entry rail portion of the apparatus of FIG. 1.

FIG. 2 shows in greater detail inlet rail support structure defining portions 10A, 11, 11C, 11D suitable for use in the apparatus of FIG. 1. Thus the sprocket carrier 11 comprises a head casting having integral therewith the arm 11C of the feed run 9 and means for pivotally linking the carrier at point 19A to the arm 10A of the return run. The arm 10A includes extension means 22 to cater for changing geometry when the sprocket carrier 11 is moved laterally, and additionally the arm 11C is provided with extension means 22 to facilitate the provision of chain tensioning means at the carrier 11. The dashed line in FIG. 2 shows the dropped position of the end support structure and in particular shows the parallel motion of the arms 11C, 11D into this dropped position with the pivot at position 20A remaining fixed. FIGS. 3 and 4 show the sprocket in even greater detail. Thus, the head casting comprises a hub 30 in which the sprocket wheel 11B of FIG. 1 is journalled while a bracket 31 defining a bush carried by the head casting facilitates the pivotal connection of the arm 10A to the sprocket carrier 11. A further bored bracket 32 serves for imparting lateral movements to the carrier 11 at the crosshead $X_I$.

Figure 5:
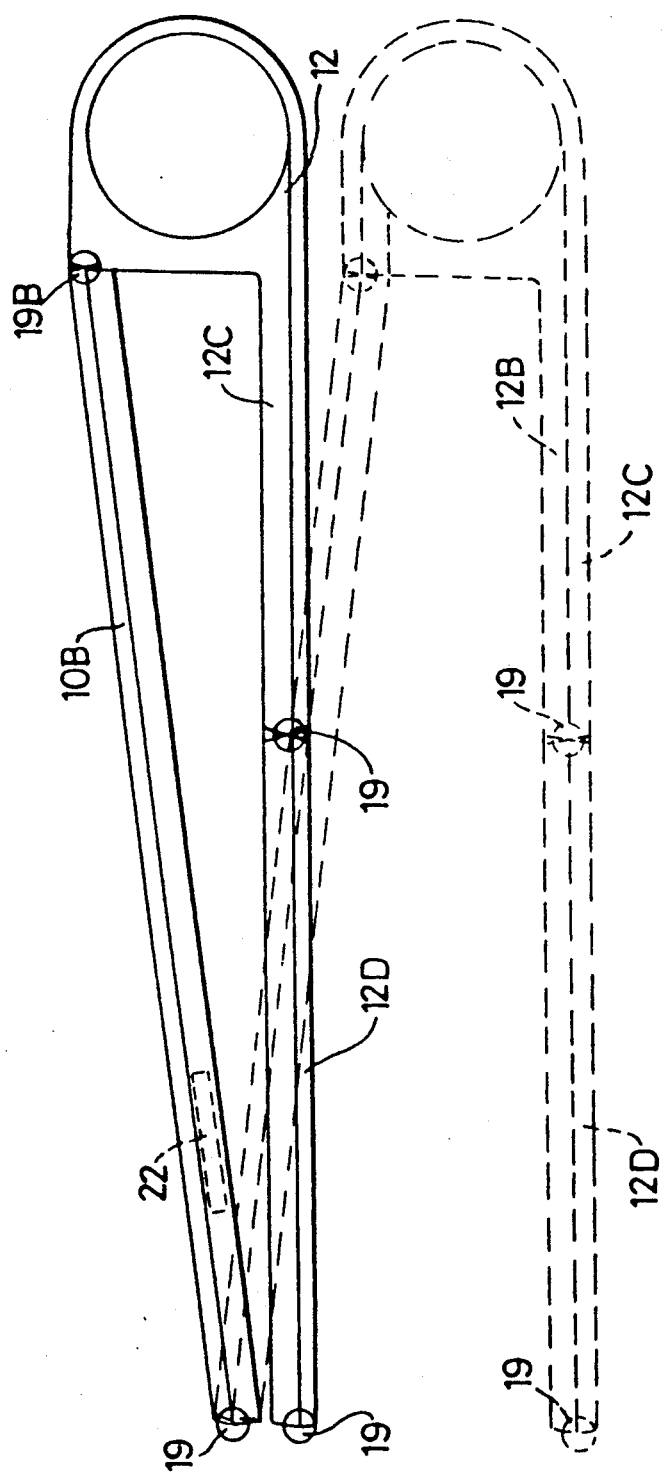
FIG. 5 shows in greater detail a plan view of an exit rail portion of the apparatus of FIG. 1.

FIG. 5 shows in detail a rail support structure for the outlet rail end i.e. including arm 10B suitable for the apparatus of FIG. 1. As will be noted this has considerable similarity to the inlet rail end of FIG. 5 but the range of movement of the sprocket carrier 12 is considerably greater than that of carrier 11. Again, the sprocket carrier 12 (in the form of a head casting) includes an arm 12C integral therewith defining part of the feed run 9.

Figure 6:
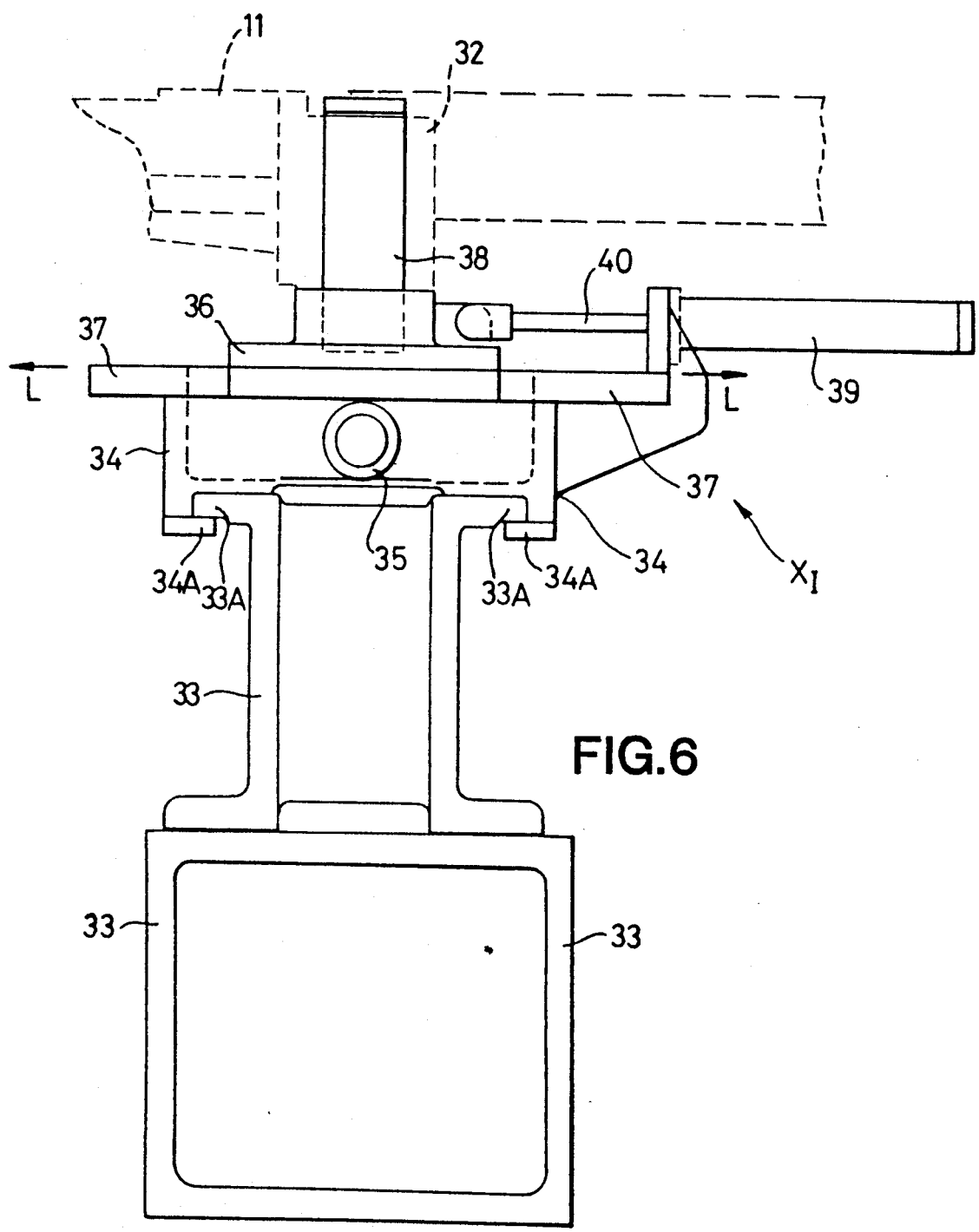
FIG. 6 shows a side elevation f the mounting arrangement for a sprocket wheel of the rail.

FIG. 6 shows an arrangement for the crosshead $X_I$. Thus there is provided a support column 33 on which a carrier member 34 is slidably mounted via sliding flange arrangement 33A, 34A whereby the carrier member 34 has sliding motion out of the plane of the paper in FIG. 6 i.e. in the transverse direction T—T in FIG. 1. Movement of the carrier member 34 in the direction T—T is achieved by a threaded rod device 35 engaging a "nut" fixed to the member 34. A slider 36 moving on guides 37 on the carrier member 34 supports a pin 38 which is fitted into the bracket 32 of the carrier 11 whereby the various motions are imparted to the carrier 11. The guides 37 enable the slider 36 to have motion in the longitudinal direction L—L for chain tensioning purposes and control of motion of the slider 36 in this direction is through a hydraulic cylinder 39 carried by the member 34 and having an actuating rod 40 coupled to the slider 36. The arrangement at the crosshead $X_O$ can be similar but in this case provision for motion in the L—L direction will not be required and the cylinder 39 can be dispensed with.

Figure 7:
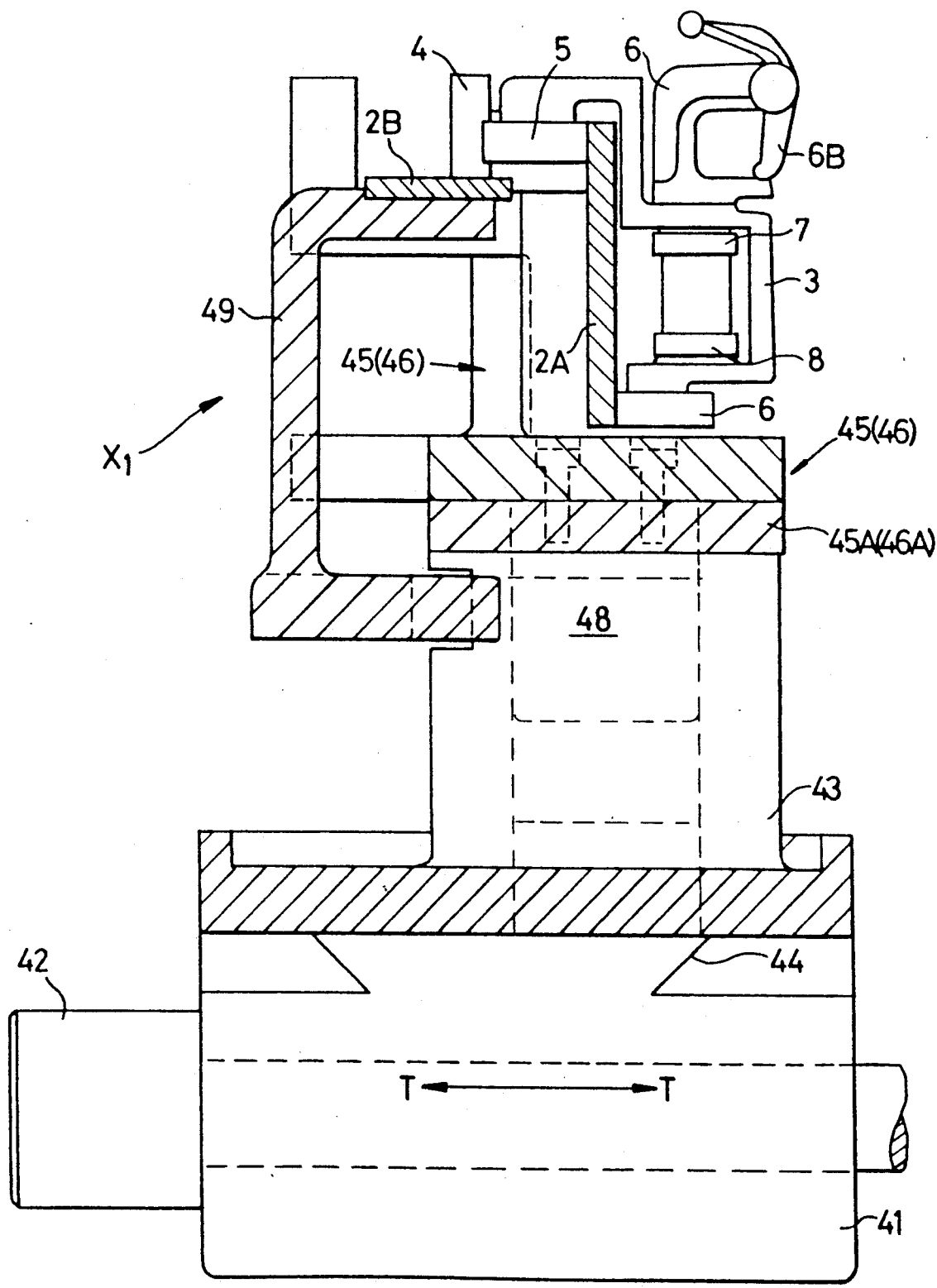
FIG. 7 shows a front elevation of a pivot joint suitable of the apparatus of FIG. 1.

Referring to FIG. 7, the chain comprises holders 3 pivotally joined by links 7 and 9. Each holder has a set of rollers 4,5, for vertical and horizontal guiding on tending to the outlet end 12A. Cam means (not shown) can be provided at the inlet and outlet ends 11A, 12A to move the film clips of the holders 3 to a closed film gripping position at the inlet 11A for movement of the film through the conveying passage and to an open position at the outlet end 12A to free the film.

Figure 8:
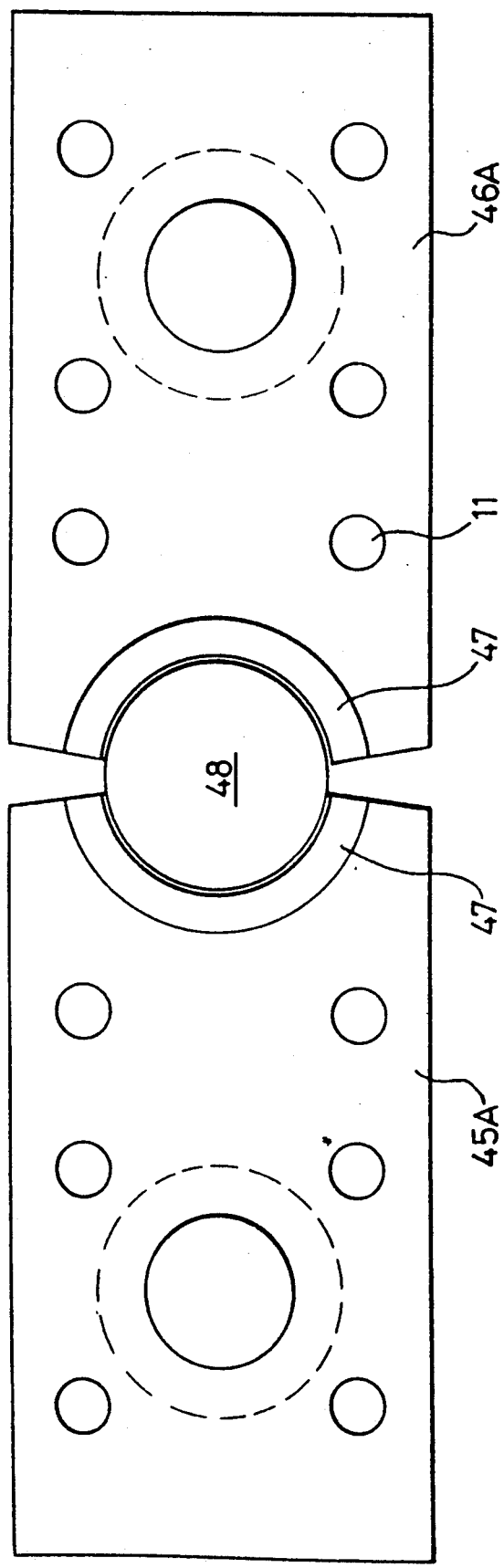
FIG. 8 shows a plan view of a connecting piece pair use in the pivot joint of FIG. 7.

FIG. 7 further shows the arrangement of crosshead $X_1$ for the pivot points 19 in the apparatus carrier body 41 mounted on a pedestal (not shown) and slidable in a transverse direction T—T on the pedestal by means of a sliding arrangement similar to the items 33A, 34A of FIG. 6, a threaded rod 42 again being provided to impart motion to the body 41. A support block 43 is movable on the body 41 in the direction L—L (i.e. out of the plane of the paper in FIG. 7) by virtue of the sliding dovetail guide 44, and the block 43 serves to support successive rail support members 45, 46 in such a manner that the rail support members are relatively pivotal. To this end, the rail support members 45, 46 carry respective connecting pieces 45A, 46A. Referring to FIG. 8, pieces 45A, 46A each include an arcuate flange segment 47, and these segments 47 surround a pin 48 mounted in the block 43, appropriate end spacing being present between the segments 47 to provide the desired maximum angle of pivoting between the rail support members 45, 46. To provide stability, a connecting arm 49 links the members 45, 46. Further, by the segments 47, changing geometry conditions created by arcuate bending of the rail 2A at the pivot can be satisfactorily accommodated. The above joint arrangement is in fact covered by the applicants U.K. Patent Application No. 8809655.7 filed 23 April 1988.

Suitable extension joints for use in the arms 10A, 12A (and also in arm 11C) are illustrated in FIGS. 9A and 9B. Thus FIG. 9 shows a simple stepped overlapping plate arrangement 51, 52, while in FIG. 9B overlapping plate portions 53, 54 of L shaped cross section are present with the portions 53, 54 being linked together by a pin 55 located in an elongate slot 56. Further variations are possible, such as for example a multi-part telescopic construction.

FIG. 10 shows part of a prior art stenter arrangement where the feed and return runs, 9, 10 are moved in parallel over width adjustment range R from a maximum (full line) to a minimum (dashed line), the return run 10 in this case being outwith the chambers 16, 17. It will be evident that for the provision of a reasonable range R the sprocket 11B (12B) will require to be of relatively large diameter D if the runs 9, 10 are not to foul the side wall of chamber 16 (17). By having the return run 10 set in the present arrangement, sprockets 11B, 12B of relatively smaller diameter can be used.

Figure 11:
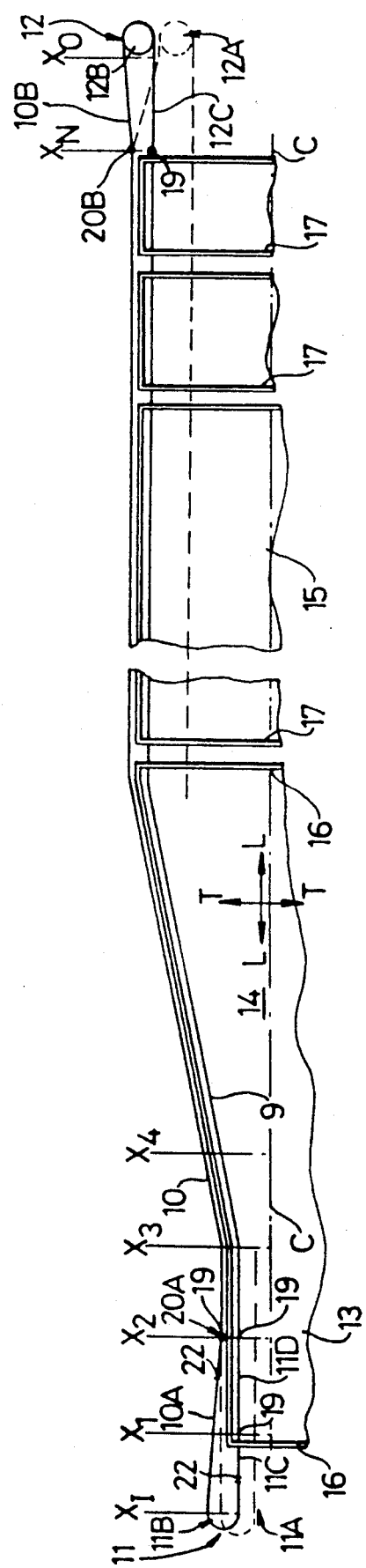

Entry and outlet rail structures for the embodiments of FIGS. 11 and 12 are generally similar to the arrangements at FIG. 2-5. In the stenter apparatus shown in FIG. 11, the return run 10 passes on the outside of the heating chamber 16 and the crystalling or cooling chambers 17. The end portions 10A, 10B of the run 10 adjacent the sprockets 11B, 12B are again pivot to permit lateral adjustment of the feed run 9, and the outer run portion from 20A to 20B is fixed in position. Unlike the embodiment of FIG. 1, however, the last intermediate crosshead $X_N$ is located outside the final chamber 17 at the endwall thereof, and in this case the arm 10B is pivotal at the final intermediate crosshead $X_1$.

FIG. 12 shows a further embodiment similar in which the arm 10A is pivotal at the first intermediate crosshead $X_1$.

I claim:

1. Stenter apparatus for stretching a web to produce relatively thin film comprising:
a film treatment chamber having an inlet and an outlet;
first and second pairs of laterally spaced sprockets, each pair disposed respectively adjacent to said inlet and said outlet;
a laterally spaced pair of endless chains carried on rails by said first and second pairs of sprockets passing through said chamber and including an inner feed run and an outer return run, each of said chains including film clip holders running on said rails facing the inner feed runs defining a film conveying passage having in succession an outlet section, a diverging film stretching section and an outlet or relaxation section;
adjustment means for lateral displacement of the endless chains for varying the width of the conveying passage, said adjustment means including shifting means to provide adjustment movements of each of the feed runs in a lateral direction towards or away from the corresponding return run which is fixed laterally; and
pivot means to permit pivoting motions of portion of each of the return runs adjacent to the ends thereof to allow said adjustment movements of each of the feed runs.

2. Stenter apparatus as claimed in claim 1 wherein:
said shifting means comprises transversely located rotatable shafts threaded to support elements of each of the inner runs, said support elements being located at pivot points of adjacent sections of each of the inner runs.

3. Stenter apparatus as claimed in claim 1 wherein:
said shifting means includes crossheads positioned intermediate the ends of the endless chains, at least one of said pivoting portions of one of the outer runs being pivotally connected to the adjacent portion thereof at the first of said intermediate crossheads.

4. Stenter apparatus as claimed in claim 1 wherein:
said shifting means includes crossheads positioned intermediate the ends of the endless chains, at least one of said pivoting portions of one of the outer runs being pivotally connected to the adjacent portion thereof at an intermediate crosshead other than the first or the last.

5. Stenter apparatus as claimed in claim 4 wherein:
said one pivoting portion is pivotally connected to the adjacent portion of one of the outer runs at the second and at the penultimate of the intermediate crossheads.

6. Stenter apparatus for stretching a web within a treatment chamber to produce relatively thin film comprising:
first and second pairs of laterally spaced sprockets, each pair disposed respectively adjacent to said inlet and said outlet;
a pair of inner rails each pivotally connected between one sprockets of each of said first and second pairs;

a pair of outer rails each pivotally connected between the other sprocket of each of said first and second pairs, each of said outer rails having an intermediate section fixed in said chamber;

a laterally spaced pair of endless chains carried by said first and second pairs of sprockets formed to pass through the chamber, each of said chains including film clip holders running on rails, facing inner holders defining a film conveying passage comprising in succession a feed section, a stretching section and a relaxation section;

adjustment means for lateral displacement of the endless chains for varying the width of the conveying passage, said adjustment means including shifting means to provide adjustment movements of each of the feed rails towards or away from the corresponding outer rail;

pivot means to permit pivoting motions of portions of the outer rails adjacent the ends thereof to allow said adjustment movements of each of the inner rails;

at least one of the input and outlet ends of one of said endless chains having a single sprocket mounted on a laterally movable carrying body, the respective endless chain passing around said single sprocket with chain portions extending axially away from said single sprocket to define end chain portions of the associated ones of said inner and outer rails; and an adjustable length radius arm hingeably connected at one end of said carrying body and at the other end to an end of a set section of the outer rail, said carrying body including a leg integral therewith defining a portion of the inner rail.

7. Stenter apparatus as claimed in claim 6 wherein:
said shifting means comprises transversely located rotatable shafts threaded to support elements of each at the inner rails, said support elements being located at pivot points of adjacent sections of each at the inner rails.

8. Stenter apparatus as claimed in claim 6 wherein:
said shifting means includes crossheads positioned intermediate the ends of the endless chains, at least one of said pivoting portions of one of the outer rails being pivotally connected to the adjacent portion thereof at the first of said intermediate crossheads.

9. Stenter apparatus as claimed in claim 6 wherein:
said shifting means includes crossheads positioned intermediate the ends of the endless chains, at least one of said pivoting portions one of the outer rails being pivotally connected to the adjacent portion of the run at an intermediate crosshead other than the first and the last.

10. Stenter apparatus as claimed in claim 6 wherein:
said the inner rails are disposed within the treatment chamber while the the outer rail is disposed on the outside of the treatment chamber.

* * * * *